(12) United States Patent
Eveson

(10) Patent No.: US 9,898,192 B1
(45) Date of Patent: Feb. 20, 2018

(54) METHOD FOR ENTERING TEXT USING CIRCULAR TOUCH SCREEN DIALS

(71) Applicant: Ryan James Eveson, Glenview, IL (US)

(72) Inventor: Ryan James Eveson, Glenview, IL (US)

( * ) Notice: Subject to any disclaimer, the term of this patent is extended or adjusted under 35 U.S.C. 154(b) by 248 days.

(21) Appl. No.: 14/757,180

(22) Filed: Nov. 30, 2015

(51) Int. Cl.
*G06F 3/0488* (2013.01)
*G06F 3/0481* (2013.01)

(52) U.S. Cl.
CPC ...... *G06F 3/04886* (2013.01); *G06F 3/04817* (2013.01)

(58) Field of Classification Search
CPC combination set(s) only.
See application file for complete search history.

(56) References Cited

U.S. PATENT DOCUMENTS

| | | | |
|---|---|---|---|
| 2005/0195159 A1* | 9/2005 | Hunleth | G06F 3/0236 345/156 |
| 2011/0029869 A1* | 2/2011 | McLennan | G06F 3/017 715/702 |
| 2015/0040056 A1* | 2/2015 | Cho | G06F 3/018 715/773 |

* cited by examiner

*Primary Examiner* — Ryan Barrett
*Assistant Examiner* — Haimei Jiang
(74) *Attorney, Agent, or Firm* — Lorimer Labs; D'Arcy H. Lorimer

(57) ABSTRACT

A method for entering text in circular touch screen equipped devices is disclosed. After initializing text entry, a dial displaying all possible text choices is presented in a linear array around the perimeter. The touch screen dial is divided into equal angular sectors, a portion of the array of selectable characters is assigned to each sector. Upon first selection of a sector, the array of characters assigned to that sector is expanded, a single character to each sector of the dial. A single character is then selected by contact with the appropriate sector. The number of characters assigned to each sector is one less than the total number of sectors on the dial, leaving one sector without a character. The method contains both tap and swipe elements in the selection process.

5 Claims, 9 Drawing Sheets

| Number of Sectors | Number of Characters/sector |
|---|---|
| 4 | 3 |
| 6 | 5 |
| 8 | 7 |
| 10 | 9 |
| 12 | 11 |
| [n] | [n-1] |

METHOD FOR ENTERING TEXT USING CIRCULAR TOUCH SCREEN DIALS

BACKGROUND OF THE INVENTION

The invention relates to the entering of data touch screen displays. More specifically, the invention relates to a method for entering text into devices using circular touch screen displays.

Modern electronic devices such as smart phones, tablets, and even wrist watches utilize modern display systems that incorporate touch, or surface contact, to activate various control functions. While many of these devices have been increasing the display area and size, there are a number of devices that have limited display areas. These devices include wrist watches and other wearable electronic devices such as exercise monitors, blood pressure monitors, heart rate monitors, and the like. These devices have a much smaller display area and due to their small footprint, particularly if they are meant to be worn on the wrist of the user. Which makes entering data (or activating functions) much more difficult and cumbersome. In prior art devices, particularly the "calculator" watches, a "Siamesed" keyboard was attached to the watch, but these were also difficult to use due to small button size. The complexity of these keyboards added cost to manufacture and reduced reliability.

These and other limitations of the prior art will become apparent to those of skill in the art upon a reading of the following descriptions and a study of the several figures of the drawing.

SUMMARY OF THE INVENTION

It is an object of the present invention to provide a method for entering character data into a device equipped with a circular shaped touch screen display, including making contact with the circular shaped touch screen display in a designated area to enable a character entry process; subsequent to enabling the character entry process, dividing the circular shaped touch screen display into N sectors, each of the N sectors defined by two boundary lines extending from an intersection at an approximate geometric center of the circular shaped touch screen display to an outer diameter of the display, the intersection of the two boundary lines defining an angle Alpha, such that N multiplied by Alpha equals 360 degrees of angle; displaying a group of characters on the display, the character to be entered contained within the group of characters, which are divided into N sub groups of (N−1) characters, each of the N sub groups of (N−1) characters being displayed within each of the N sectors on the display, the character to be entered contained within a first sub group displayed within a first sector; subsequent to displaying the group of characters, selecting and displaying (N−1) characters of the first subgroup, each of (N−1) characters being displayed individually in (N−1) sectors, the character to be entered displayed within a second sector; and selecting the character to be entered by making contact with the second sector.

It is another object of the present invention to provide a method for entering character data into a device equipped with a circular shaped touch screen display, including making contact with the circular shaped touch screen display in a designated area to enable a character entry process; subsequent to enabling said character entry process, dividing said circular shaped touch screen display into N sectors, each of the N sectors defined by two boundary lines extending from an intersection at an approximate geometric center of the display to an outer diameter of the display, the intersection of the two boundary lines defining an angle Alpha, such that N multiplied by Alpha equals 360 degrees of angle; displaying a group of characters on the display, a character to be entered contained within the group, the group of characters divided into N sub groups of (N−1) characters, each of the N subgroups of (N−1) characters being displayed within each of the N sectors on the display, a first sub group of (N−1) characters displayed within a first sector, a second sub group of (N−1) characters displayed within a second sector, the character to be entered contained within the second sub group; displaying the (N−1) characters of the first sub group by making contact with the first sector, each of (N−1) characters of the first sub group being displayed individually in (N−1) sectors; displaying the (N−1) characters of the second sub group by swiping from the first sector to the second sector, each of (N−1) characters of the second sub group being displayed individually in (N−1) sectors, replacing the (N−1) characters of the first sub group, the character to be entered displayed in a third sector; and selecting the character to be entered by tapping the third sector.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF THE PREFERRED EMBODIMENTS

Modern display devices incorporating touch screens have exploded in popularity, particularly in consumer products such as tablets, data pads, and wireless phones. Applications of these screens have been extended to include wearable devices such as wrist watches and body function monitors such as heart rate monitors. While tablets and phones boast of larger screens, wearable devices are often limited to much smaller screens to satisfy the customer demands of light weight, portability, and cosmetics. Smaller touch screens mean smaller character fonts, and smaller touch zones for selection of characters and icons. Displaying an image of the standard Querty keyboard keys, in a small diameter wrist watch screen for example, makes it all but impossible for the user to enter text data. The user may be forced to carry a pointed tool to select text in such a situation, which is inconvenient.

The present invention seeks to resolve these issues by providing methods to enter text by expanding portions of a character set in easily viewed sections. While the methods heretofore described are applied to text entry, they may also be applied to the selection of icons and the subsequent activation of programs or code, as can be appreciated by those skilled in the art. Further, while these methods are described within the framework of a circular shaped display, this in itself is not meant to be limiting, in that the methods herein described may also be applied to rectangular or otherwise oddly shaped touch screen displays.

Figure 1:
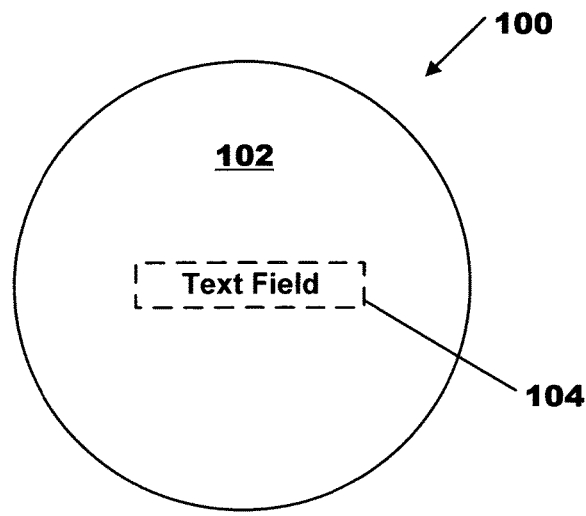
FIG. 1 is a schematic view of a circular touch screen display having a text block for entering character data, in accordance with an example embodiment of the present invention.
Figure 2:
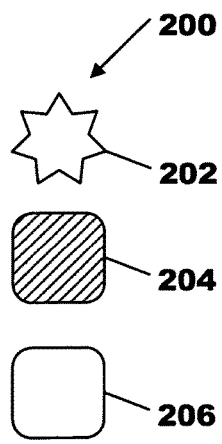
FIG. 2 is a schematic view of symbols used to indicate various contact actions used to enter character data in accordance with example embodiments of the present invention.

FIG. 1 is a schematic view 100 of a circular touch screen display 102 having a text block 104 for entering character data, in accordance with an example embodiment of the present invention. FIG. 2 is a schematic view 200 of symbols used in this specification and drawings, to indicate various contact actions utilized to enter character data on touch screen 102. Symbol 202 represents a "tap" or touch and immediate release. Symbol 204 (rounded square with cross hatching) represents a touch and hold contact. A "swiping" action results from moving a "touch and hold" action across the screen 102. Symbol 206 (empty rounded square) represents a release from contact or a breaking of contact with the screen 102. This is usually the terminating action from a touch and hold or swipe. Alternately, a tap 202 can also be represented by a touch 204 followed by a release 206. As is well known to those skilled in the art, "contact" with a touch screen can be carried out with a finger or another object such as pen or stylus. For user convenience, the user's finger is preferable to another object, and as such the contact zones defining process actions need be sized accordingly.

Example embodiments of the present invention can be divided into two main processes, a "swipe" based process and a "tap" based process. The tap based process can be further divided into two tap based processes, the second of which has combined tap and swipe based elements. The main swipe based process is disclosed in FIGS. 3-7; the second main tap based process in FIGS. 3, 8-11; the third tap and swipe based process FIGS. 12-17. Further clarification is provided in the discussion below.

Figure 3:
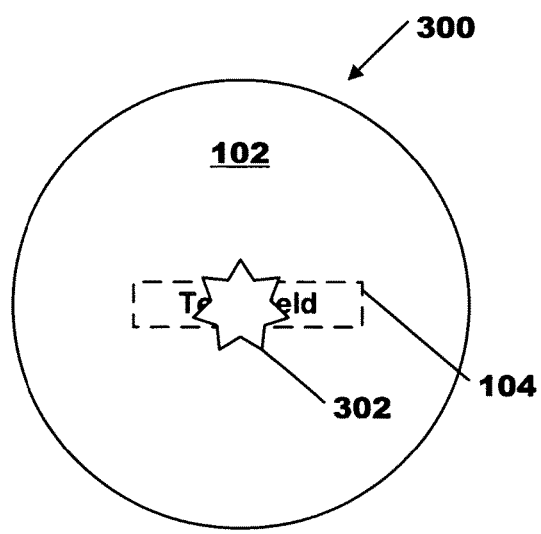
FIG. 3 is a schematic view of a circular touch screen display wherein the user taps the text block to initiate character entry process, in accordance with an example embodiment of the present invention.

FIG. 3 is a schematic view 300 of a circular touch screen display 102 wherein the user taps 302 the text block 104 to initiate character entry process, in accordance with an example embodiment of the present invention. Although the initial or "wake up" action is a tap, the main process steps are swipe based in this example embodiment. After the initialization step of FIG. 3, the dial display of FIG. 4 is presented.

Figure 4:
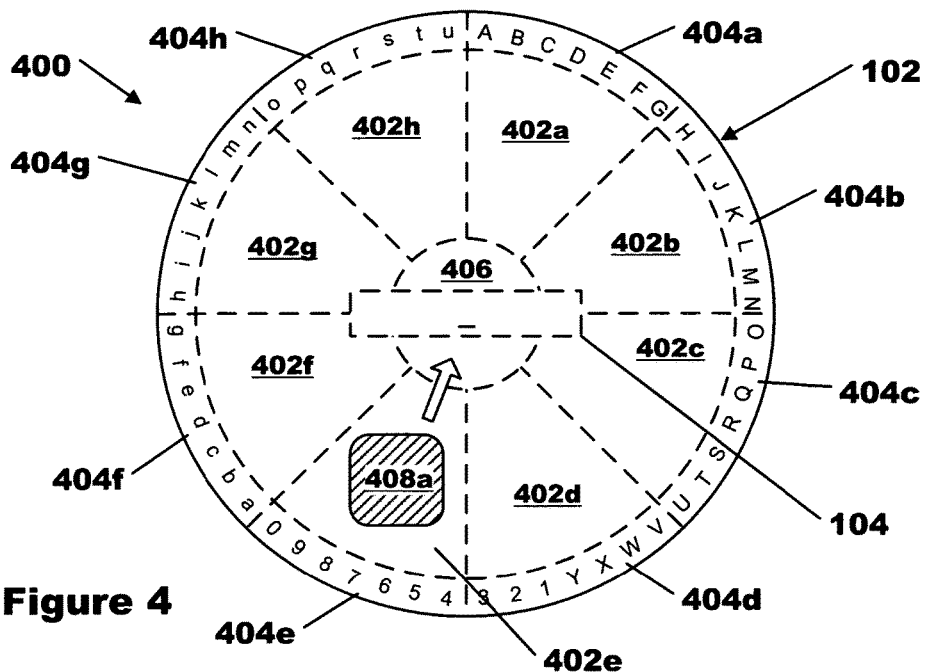
FIG. 4 is a schematic view of the character ring and touch zone sectors, in accordance with an example embodiment of the present invention.

FIG. 4 is a schematic view 400 of the character display ring 404a-h and touch zone sectors 402a-h, in accordance with an example embodiment of the present invention. In an outer circumferential ring 404 (a-h), all the characters available for selection are presented. The character ring is divided into sections, the boundaries of which are determined by angular sectors 402a-h. In the example embodiment of FIG. 4, the screen 102 has been divided into 8 sectors of equal angular dimension. However, any even number' of sectors can be chosen, depending on factors such as the screen resolution, the resolution of the touch screen sensing elements, and the number of characters in the selection. Preferably, the dial screen 102 is divided into between 4 and 12 sectors. There is a specific relationship between the number of characters in the selection set (the group from which a character is chosen), and the number of sectors, as will be explained below (see FIG. 19). At the center of screen 102 there is a "center zone" 406.

The character selection process of FIG. 4 continues with the user making contact 408a in the sector (402e) opposite from the sector (402a) containing the desired character to be entered. In the example embodiment of FIG. 4, the user wishes to enter the character "C", contained within character ring portion 404a, characters "A-H". As the user "swipes" from sector 402e to the center zone 406, the display changes to expand the character set of character ring portion 404a equally around the dial circumference (see FIG. 5).

Figure 5:
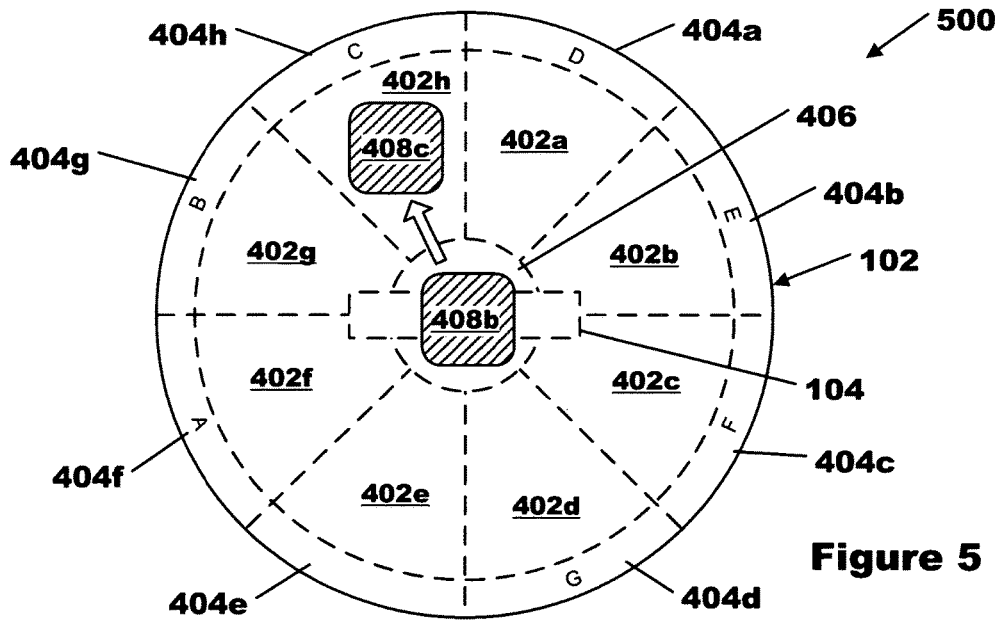
FIG. 5 is a schematic view of the expanded character ring as a user selects a sector by initiating contact, and swipes into the center zone of the display, in accordance with an example embodiment of the present invention.
Figure 6:
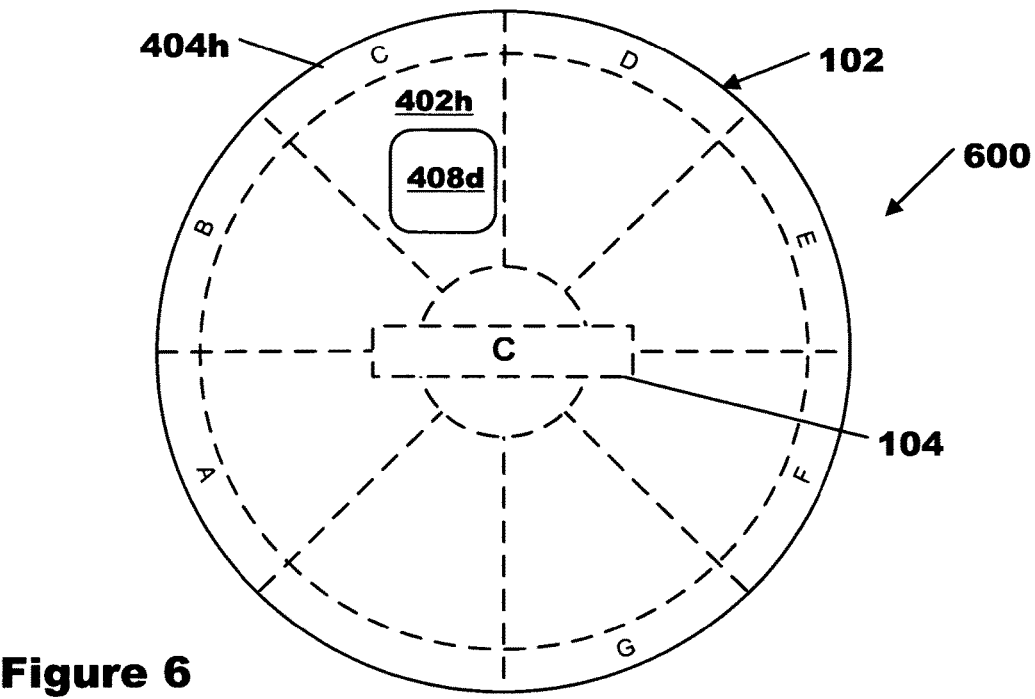
FIG. 6 is a schematic view of the selection of a character, after a user swipes from the center zone into a sector containing the character and breaks contact with the screen, in accordance with an example embodiment of the present invention.
Figure 7:
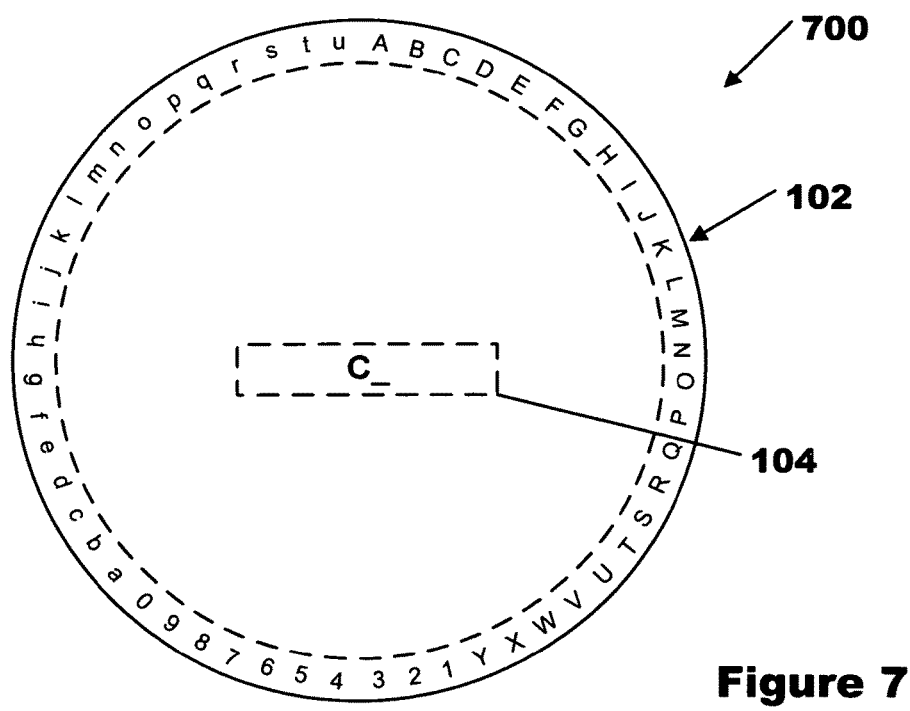
FIG. 7 is a schematic view of the screen ready for the next character entry, in accordance with an example embodiment of the present invention.

FIG. 5 is a schematic view 500 of the expanded character ring as a user selects a sector 402e by initiating contact, and swipes into the center zone 406 of the display, in accordance with an example embodiment of the present invention. In the illustrated example, characters A-G are distributed equally into the character ring portions 404*f,g,h,a,b,c,d* of sectors 402*f,g,h,a,b,c,d*. The sector where contact was initiated (402*e*) is omitted and contains no character in character ring portion (404*e*). This assures that the swiping action for making a selection is uni-directional and does not come back on itself. To make the character "C" selection, the user continues the swiping action from the center zone 406 to sector 402*h*, contact 408*b* to 408*c*. To complete the selection of character "C", the contact 408*d* is released in FIG. 6 view 600, and "C" is entered in text box 104. FIG. 7 is a schematic view 700 of the screen 102 ready for the next character entry in text box 104.

Figure 8:
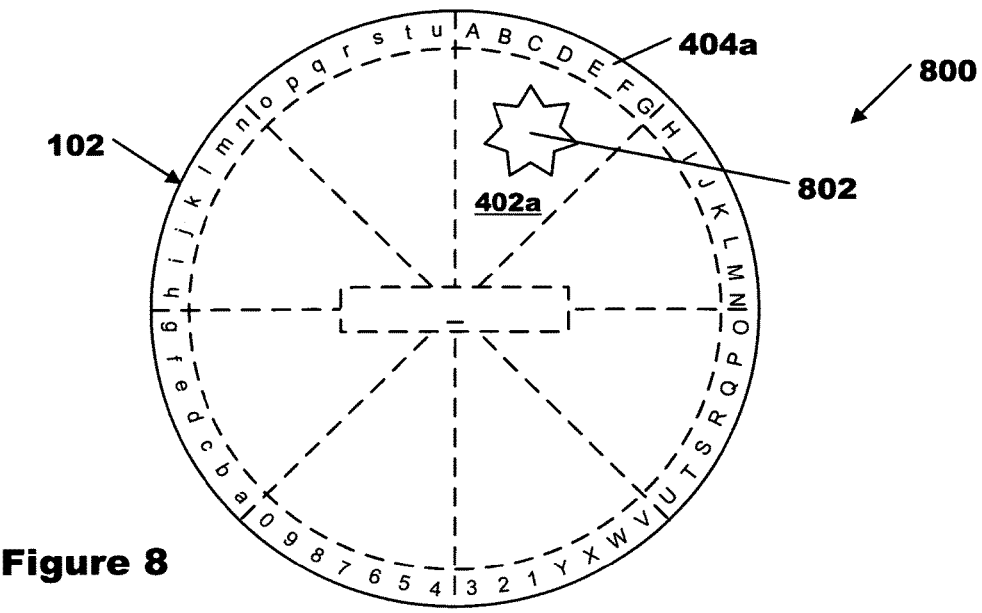
FIG. 8 is a schematic view of the initial step of a second "tap based" character entry process, in accordance with another example embodiment of the present invention.

FIG. 8 is a schematic view 800 of the initial step of a second "tap based" character entry process, in accordance with another example embodiment of the present invention. Subsequent to tapping the text box (FIG. 3) to initiate text entry, the dial configuration 102 of FIG. 8 is presented. Note that it is similar to the dial configuration of FIG. 4. However, instead of the user contacting a sector opposed to the sector containing the desired character for entry as was done in the process described in FIG. 4, the user simply taps (touch and release) the sector containing the character to be entered. In the example embodiment of FIG. 8, to enter the character "C", the user taps 802 sector 402*a* which contains the character group A-G displayed in character ring 404*a*. Subsequent to the tapping action 802, the dial display of FIG. 9 is shown.

Figure 9:
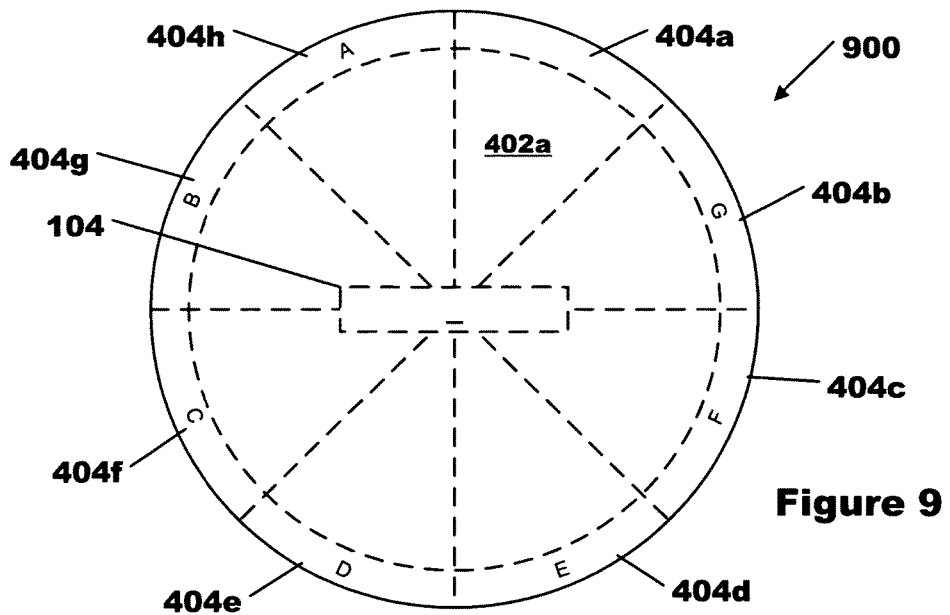
FIG. 9 is a schematic view of the expanded character ring, in accordance with another example embodiment of the present invention.
Figure 10:
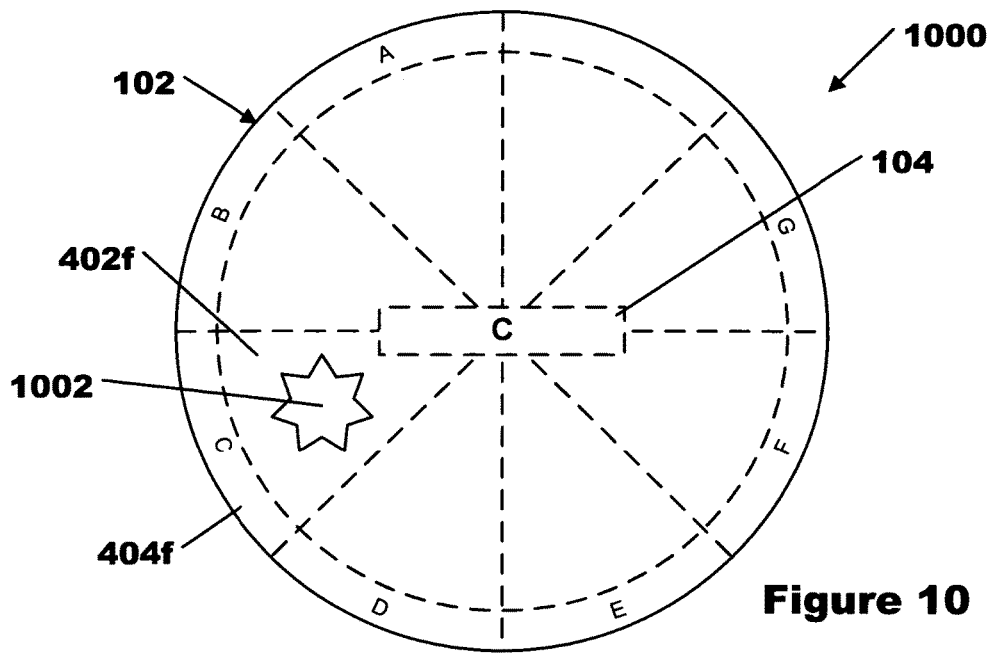
FIG. 10 is a schematic view of the selection of a character, after a user taps a sector containing the character, in accordance with another example embodiment of the present invention.
Figure 11:
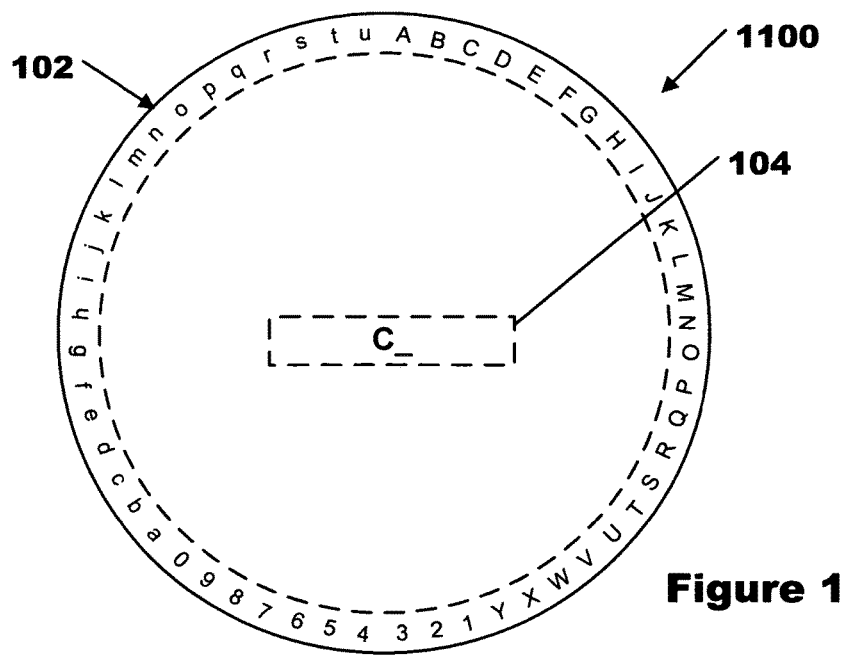
FIG. 11 is a schematic view of the screen ready for the next character entry, in accordance with another example embodiment of the present invention.

FIG. 9 is a schematic view 900 of the expanded character ring, in accordance with another example embodiment of the present invention. The selected character group A-G is uniformly distributed into all sectors except the sector 402*a* in which it was displayed in FIG. 8. The user makes the individual character selection by tapping on the appropriate sector, as is shown in FIG. 10. FIG. 10 is a schematic view 1000 of the selection of a character "C", after a user taps 1002 sector 402*f* containing the character. FIG. 11 is a schematic view 1100 of the screen 102 ready for the next character entry, subsequent to the entry of character "C" into text box 104.

FIGS. 12-17 represent a third example text entry embodiment, and are a sub-set of the second example embodiments of FIGS. 8-11 above. In the example process embodiment of FIGS. 8-11, a character group was first chosen by tapping the representative sector. A character from that group was then subsequently chosen from the expanded selection by tapping the sector containing the desired character. In the process to be described of FIGS. 12-17, the user initially contacts (not taps) the screen, and by swiping from sector to sector can see expanded character groups from which to make a selection.

Figure 12:
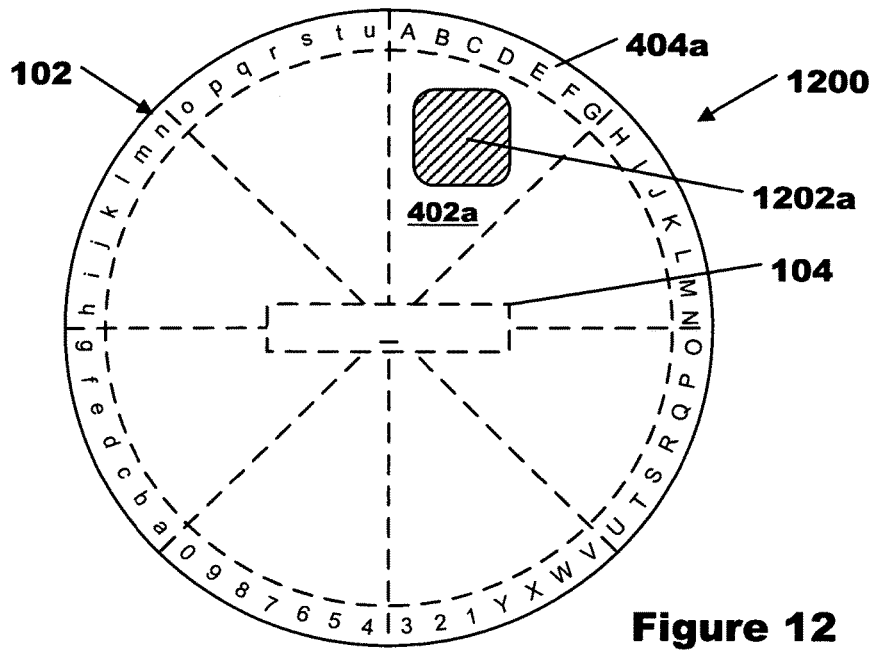
FIG. 12 is a schematic view of the initial step of a third character entry process, in accordance with another example embodiment of the present invention.
Figure 13:
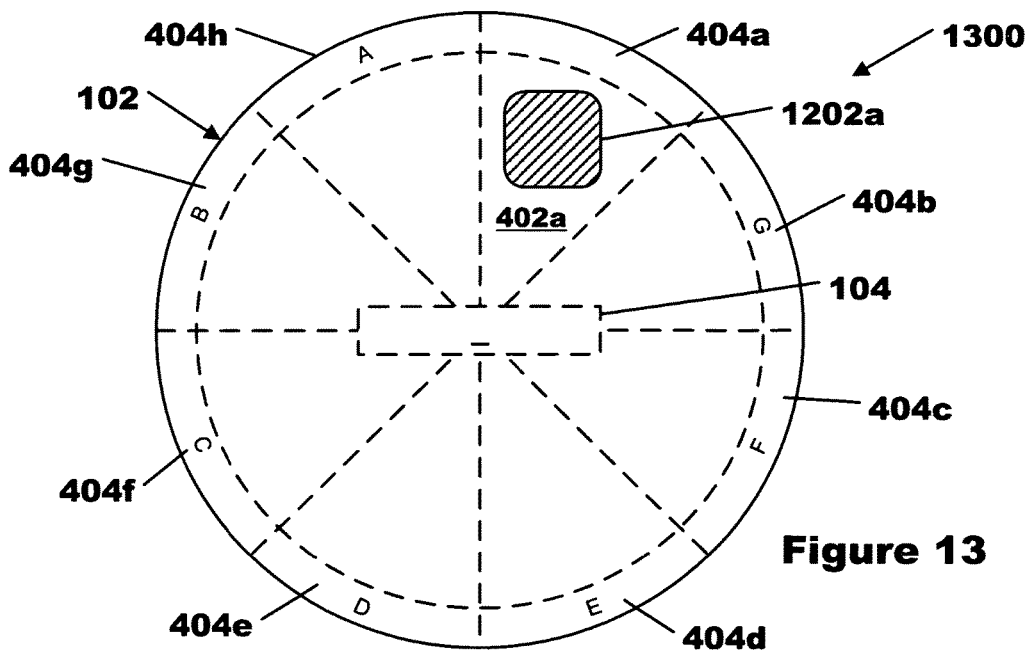
FIG. 13 is a schematic view of the expanded character ring, in accordance with another example embodiment of the present invention.
Figure 14:
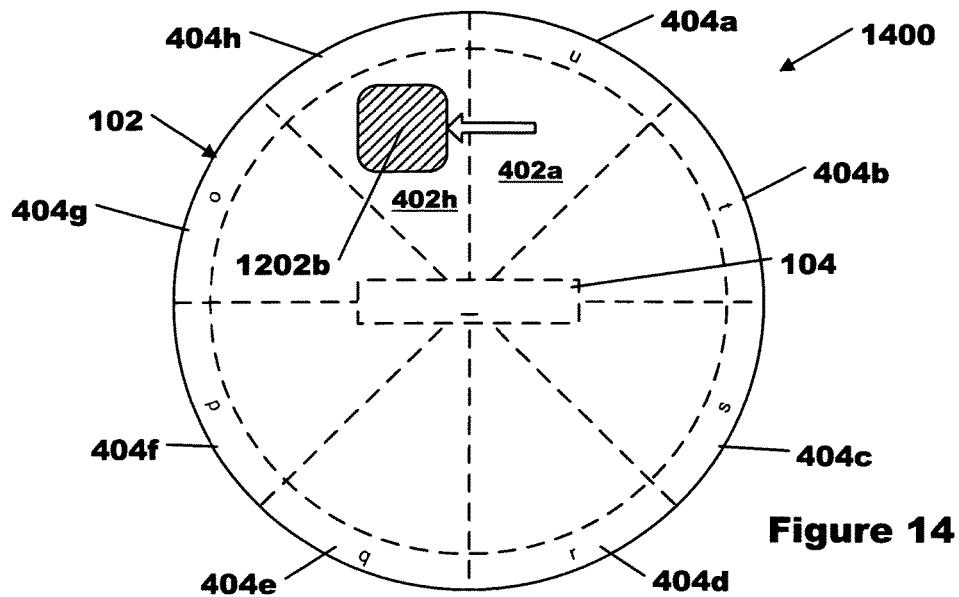
FIG. 14 is a schematic view of the expanded character ring as the user swipes from a first sector to a second sector, in accordance with another example embodiment of the present invention.
Figure 15:
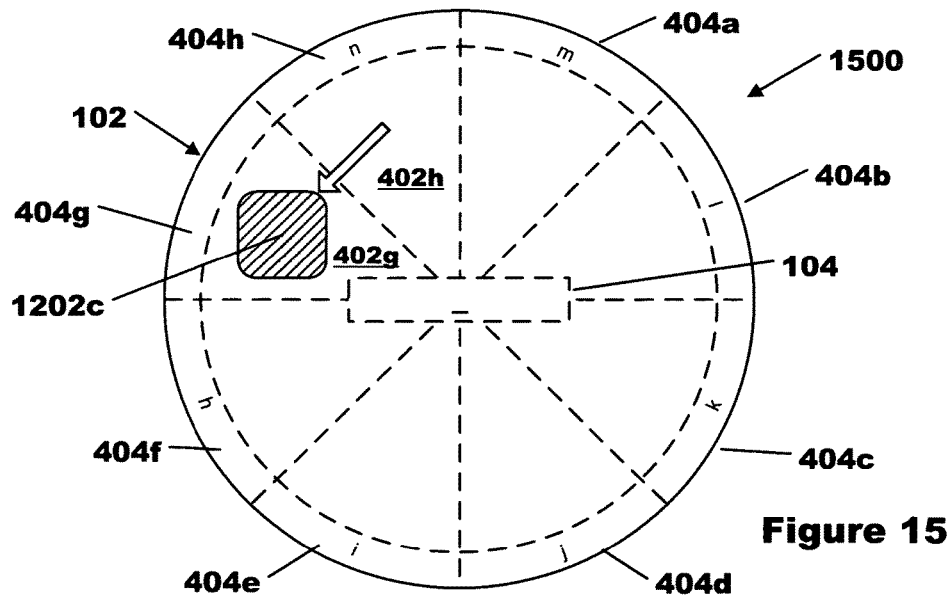
FIG. 15 is a schematic view of the expanded character ring as the user swipes from the second sector to a third sector, in accordance with another example embodiment of the present invention.
Figure 16:
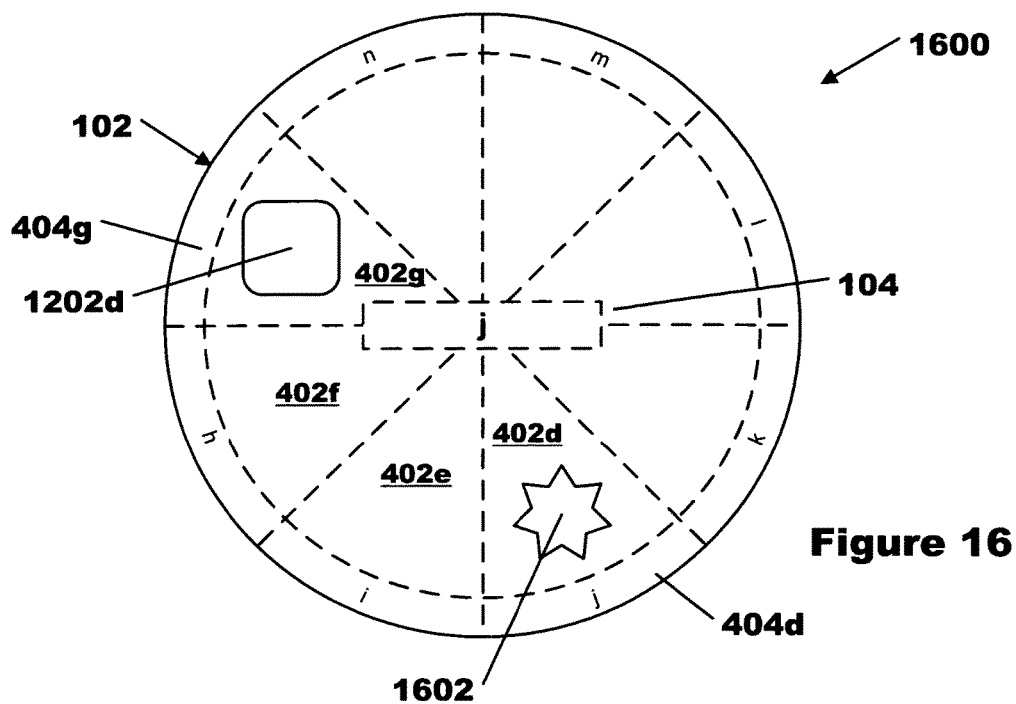
FIG. 16 is a schematic view of the user selecting a character by tapping the sector containing the desired character, in accordance with another example embodiment of the present invention.
Figure 17:
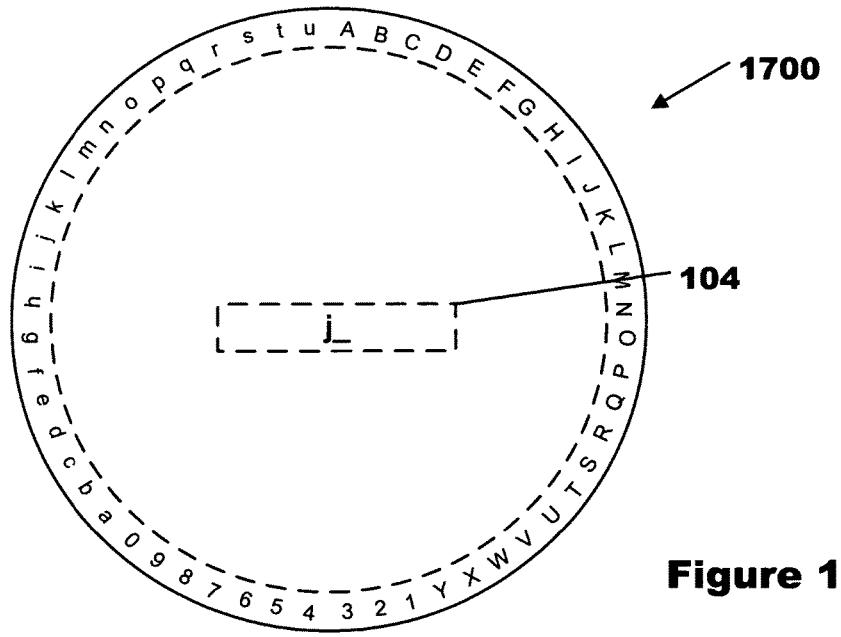
FIG. 17 is a schematic view of the screen ready for the next character entry, in accordance with another example embodiment of the present invention.

FIG. 12 is a schematic view 1200 of the initial step of a third character entry process, in accordance with another example embodiment of the present invention. Subsequent to tapping the text box (FIG. 3) to initiate text entry, the dial configuration 102 of FIG. 12 is presented. Note that this configuration is identical to that of FIG. 8. Instead of tapping a sector containing the desired character group, the user contacts a sector (touch and hold) 1202*a*, which results in the expansion of that character group around the dial, as shown in schematic view 1300 of FIG. 13. If the user removes contact at this point, the display freezes and any character from the displayed group can be selected by tapping the appropriate sector (not shown). If the user maintains contact and swipes into an adjacent sector, the character group displayed changes to the group represented by that sector in the display of FIG. 12. In the example embodiment of FIG. 14, schematic view 1400, the user swipes 1202*b* from sector 402*a* to 402*h*. In doing so, expanded character group "o-u" is displayed in the character ring. In the example embodiment of FIG. 15, schematic view 1500, the user swipes 1202*c* from sector 402*h* to sector 402*g*, displaying the character set "h-n" in the character ring. In the example embodiment of FIG. 16, schematic view 1600, the user releases contact 1202*d* freezing the display, and taps 1602 sector 402*d*, selecting character "j". In the example embodiment of FIG. 17, schematic view 1700, the character "j" is entered into text box 104.

As heretofore mentioned, there is a specific relationship between the number of sectors a dial is divided into, and number of characters that can be presented. For compatibility with the tap based and swipe based example processes presented, an even number of sectors is preferred. An even number of sectors is a requirement for the first swipe based process of FIGS. 1-7, because the initial character group selection is made from a sector 180 degrees opposed to the initial sector contacted by the user. For an odd number of sectors, the desired sector would be unclear, as the selection 180 degrees from contact would be a boundary between two adjacent sectors. However, for tap based processes of FIGS. 8-11 and 12-17, an odd number of sectors is allowed.

Figures 18, 19:
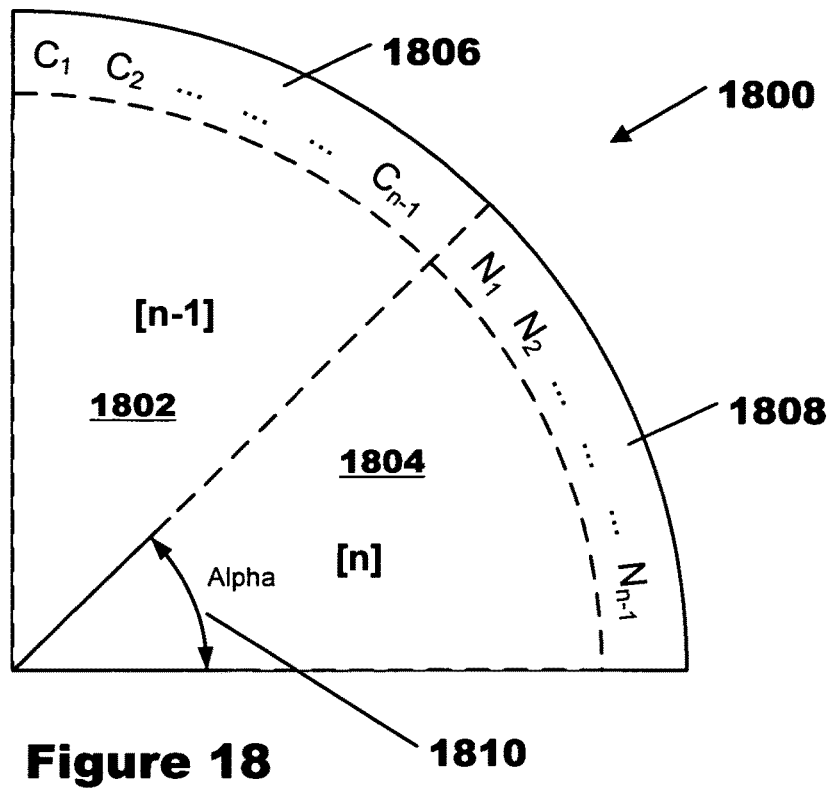
FIG. 18 is a schematic view of sector and character layout, in accordance with an example embodiment of the present invention.
FIG. 19 is a table illustrating the relationship between the number of sectors and the number of characters per sector, in accordance with an example embodiment of the present invention.

FIG. 18 is a schematic view 1800 of sector and character layout, in accordance with an example embodiment of the present invention. Two adjacent sectors are shown, sector "n−1" 1802 and sector "n" 1804. The angle Alpha of each sector is 1810, and although only two sectors are represented, the dial can have any number. Each sector is presumed to have the same angle 1810. Given a total of "n" sectors, the number of characters presented or displayed in each sector is "n−1". This is a requirement based on the expanded display, in which a chosen character array is divided into "n−1" sectors, which excludes the sector in which contact was/is made. In the example embodiments, the complete character array is shown displayed as a single ring of characters at the perimeter of the dial (section 1806, 1808). However as can be appreciated by those skilled in the art, the characters can be displayed in any convenient position within each sector. This may become important if a large number of character choices is desired and the display size is small. For a large number of characters, a large number of sectors is required, which means the size (angular dimension 1810) of each sector is reduced. To fit a large number of characters within small sectors means the use of small fonts, or displaying the characters in multiple rows.

Although discussion heretofore has been limited to selection of characters for text entry, the methods of the present invention can also be directly applied to the selection of icons on the touch screen for running selected programs, applications, and opening files. One only need substitute program icons for characters, the final selection of each character being substituted by the action of starting a program or opening a file.

In alternate example embodiments of the present invention, the "empty" sector (for example sector 402*e* in FIG. 5; sector 402*a* in FIG. 9; sector 402*a* in FIG. 13; sector 402*h* in FIG. 14; or sector 402*g* in FIG. 15) can be used for a number of functions. In one alternate example embodiment, tapping the empty sector can initiate a "back step" command, returning the user to the previous screen. In another example alternate embodiment, tapping the empty sector will enter a non-alphabetic character such as "space" or "*". In yet another example alternate embodiment, "caps lock" could be engaged. In yet another example alternate embodiment, tapping the empty sector could engage alternate font types (such as "Arial", "Times New Roman", etc.).

FIG. 19 is a table illustrating the relationship between the number of sectors and the number of characters per sector, for an even number of sectors, in accordance with an example embodiment of the present invention.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A method for entering character data into a device equipped with a circular shaped touch screen display, comprising:

making contact with said circular shaped touch screen display in a designated area to enable a character entry process;

subsequent to enabling said character entry process, dividing said circular shaped touch screen display into N sectors, each of said N sectors defined by two boundary lines extending from an intersection at an approximate geometric center of said circular shaped touch screen display to an outer diameter of said circular shaped touch screen display, said intersection of said two boundary lines defining an angle Alpha, such that N multiplied by Alpha equals 360 degrees, with Alpha measured in degrees angle;

displaying a group of characters on said circular shaped touch screen display, a character to be entered contained within said group of characters, said group of characters divided into N sub groups of (N−1) characters, each of said N sub groups of (N−1) characters being displayed within each of said N sectors on said circular shaped touch screen display, said character to be entered contained within a first sub group of said N sub groups, displayed within a first sector of said N sectors;

subsequent to displaying said group of characters, selecting and displaying (N−1) characters of said first subgroup of said N subgroups, each of (N−1) characters being displayed individually in (N−1) sectors providing a center zone, said center zone having a fixed radium and a circular shape centered approximately at said geometric center of said circular shaped touch screen display, said center zone imposed over a portion of said N sectors, swiping from a second sector on said circular shaped touch screen display into said center zone, surface contact from said second sector into said center zone triggering said selection and display of said (N−1) characters of said first subgroup, wherein said second sector is located approximately 180 degrees from said first sector on said circular shaped touch screen display; and subsequent to triggering said section and display of said (N−1) characters of said first subgroup, selecting said character to be entered by swiping from said center section to a third sector wherein said character to be entered is displayed.

2. The method as recited in claim 1, wherein said (N−1) characters of said first subgroup are displayed in all N sectors except said second sector.

3. The method as recited in claim 1, wherein said group of characters are displayed in a linear array at an outer circumference of said circular shaped touch screen display.

4. The method as recited in claim 1, wherein N has an integer value between 4 and 12.

5. The method as recited in claim 1, wherein said character to be entered is replaced with a program icon, selecting and entering said icon activates a program represented by said icon.

* * * * *